United States Patent [19]

Slegers et al.

[11] 4,016,621
[45] Apr. 12, 1977

[54] DEVICE AND METHOD FOR LAUNCHING AND/OR RETRIEVING PIPELINE SCRAPERS

[75] Inventors: Maurice Slegers, Lakewood; John D. Muchow, Cerritos, both of Calif.

[73] Assignee: Willis Oil Tool Co., Long Beach, Calif.

[22] Filed: June 6, 1975

[21] Appl. No.: 584,375

[52] U.S. Cl. .................... 15/104.06 A; 137/268; 251/174
[51] Int. Cl.² ........................................ B08B 9/04
[58] Field of Search .......... 15/104.06 R, 104.06 A, 15/3.5, 3.51; 251/174, 249.5, 288; 137/268, 556, 625.32

[56] References Cited
UNITED STATES PATENTS

| | | | |
|---|---|---|---|
| 2,786,219 | 3/1957 | Meyer | 15/104.06 A |
| 2,866,213 | 12/1958 | McArthur et al. | 15/104.06 A |
| 2,930,575 | 3/1960 | Britton | 251/174 |
| 3,064,938 | 11/1962 | Knox | 251/249.5 X |
| 3,146,792 | 9/1964 | Donnelly et al. | 15/104.06 A X |
| 3,177,513 | 4/1965 | Ellett | 15/104.06 A |
| 3,218,660 | 11/1965 | Eagleton | 15/104.06 A |
| 3,220,432 | 11/1965 | Allen | 15/104.06 A X |
| 3,537,473 | 11/1970 | De Zurik, Jr. | 251/288 X |

Primary Examiner—Edward L. Roberts
Attorney, Agent, or Firm—Paul A. Weilein

[57] ABSTRACT

A housing structure confines a ball-shaped valve member with a flow passage therethrough. One end of the flow passage serves as a cavity to receive a pipeline scraper in the form of a pig ball and a grid retains the pig ball while permitting fluid flow through the passage. The valve ball cavity may register with the chamber of a normally closed magazine to receive a pig ball therefrom or to release a pig ball thereto. The valve ball cavity may also register with one of the two ports of the housing structure to launch or retrieve a pig ball therethrough. The valve ball is completely enclosed by the housing structure with a seal at the entrance to the magazine. The magazine has a bleeder valve to the atmosphere and also has a by-pass valve to equalize the fluid pressure in the magazine with the fluid pressure in the pipeline. The valve ball has compensating freedom to move towards and away from the seal. Manually operable gearing rotates the valve ball 90° between its two alternate positions.

10 Claims, 8 Drawing Figures

DEVICE AND METHOD FOR LAUNCHING AND/OR RETRIEVING PIPELINE SCRAPERS

BACKGROUND OF THE INVENTION

The invention relates to a valve structure for launching and/or retrieving scraper bodies commonly termed "pigs" which travel through a pipeline to dislodge wax and other accumulated deposits from the interior of the pipeline. The particular embodiment of the invention disclosed herein is intended to handle pig balls which may range from two inches to sixteen inches in diameter. The pig ball valve structure may be employed to launch and retrieve pigs of other shapes and other ranges of size.

The many different valve structures that have been devised for this general purpose have various disadvantages and shortcomings which may be understood from the following discussion of the objects of the present invention.

SUMMARY OF THE INVENTION

Broadly described, the present invention comprises a rotary valve member in a housing structure that forms a valve chamber in communication with two opposite coaxial ports to permit the housing structure to be incorporated into a pipeline. The housing structure further provides a magazine that may be opened to the exterior either for the purpose of receiving a new pipeline pig ball or for releasing a retrieved pig ball. The rotary valve member has a cavity therein to receive a pig ball, which cavity is one end of a passage through the valve member and the valve member may be turned to its open position to register the cavity with one of the two ports of the housing for flow through the two ports for launching or retrieving a pig ball or the valve member may be turned to its closed position to register the cavity with the magazine to receive a new pig ball therefrom or to release a retrieved pig ball thereto.

An important object of the invention is to solve the problem of sealing the valve member against external leakage. In prior art devices the valve member is exposed to the exterior of the housing structure so that exterior leakage around the valve member becomes a serious consideration. In the Meyer U.S. Pat. No. 2,786,219, for example, both ends of a transverse tapered valve member are exposed to the exterior of the device and prevention of serious leakage to the exterior requires expensive precision machining and grinding of the cooperating valve surfaces.

The present invention avoids this problem entirely by completely enclosing the valve member in the housing structure, with no portion of the valve member exposed to the exterior. The only seal is a valve seat between the valve chamber and the scraper magazine. When the magazine is opened to the atmosphere for the insertion or withdrawal of a pig ball, full line pressure urges the valve member into effective sealing engagement with the valve seat.

An important object of the invention is to minimize spillage of the pipeline fluid during the launching or retrieving of a pig ball. This object is accomplished by the seal between the magazine and the valve chamber. The only loss of pipeline fluid is the unavoidable but insignificant loss that is incidental to the bleeding of the magazine to reduce its pressure therein to atmospheric pressure prior to opening the magazine to its exterior.

Another object of the invention is to provide a valve member that does not require precision machining. This object is attained in large part by employing a valve member that is in the shape of a ball. The valve ball rotates on an axis that is perpendicular to the axis of the two opposite valve ports. This object is achieved in further part by making the valve seat in the form of a yieldable elastomer ring at the juncture of the valve chamber and the scraper magazine. Finally, this object is achieved in further part by making the ball-shaped valve member free floating, i.e., by giving the valve ball member freedom for a certain degree of movement relative to the valve seat thereby to compensate for wear and to compensate for thermal expansion and contraction. A feature of the invention is that a valve member in the form of a ball inherently resists distortion of the valve member by high fluid pressure differential across the ball.

Still another object of the invention is to minimize resistance to rotation of the valve ball thereby not only to make it easy to rotate the valve ball but also to reduce wear on the elastomer valve seat. For this purpose a controlled bypass is provided between the valve chamber and the pig ball magazine. With the magazine closed, the bypass may be opened to equalize the fluid pressure on the opposite sides of the elastomer valve seat.

With line pressure equalized across the valve ball in this manner the problem arises of keeping the ball seated against the elastomer when the fluid pressure is balanced. This problem is solved by providing spring means to keep the valve ball seated independently of fluid pressure. Fortuitously, mounting the ball member in a free floating manner permits the spring means to be effective for its purpose. Preferably, the spring means is in the form of stacked Belleville springs that have the virtue of providing accurately predetermined spring pressure and in addition requiring minimum space in the valve chamber.

Even with the pressure of the ball against the elastomer valve seat reduced to relatively low predetermined spring pressure, considerable force may be required to rotate a valve ball large enough to enclose a spherical scraper of eight to sixteen inches in diameter. It is to be noted that a valve ball with a cavity large enough to receive a spherical pig must be of substantially greater diameter than the pig. Thus, a valve ball large enough to enclose a pig ball of sixteen inches diameter must have a diameter of approximately 21 inches. The problem of rotating such a large valve ball is solved by providing externally operated force-multiplying gearing to rotate the valve ball. In the preferred practice of the invention irreversible worm gearing is employed for this purpose, the gearing being sealed off from the valve ball.

The use of such gearing must not interfere with the floating action of the valve ball when it is idle in a position to seal off the pig ball magazine from the valve chamber. To avoid such interference, the gearing is connected to the valve ball by slot-and-tongue means in which the slot is perpendicular to the valve seat and is of a length to permit the required freedom for movement of the tongue in the slot.

The use of gearing to rotate a valve ball that is concealed from the operator makes it highly desirable to provide some expedient to insure that the pig cavity in the valve ball is accurately registered with a selected one of the two ports and alternatively is accurately registered with the pig magazine. For this purpose the invention provides two adjustable stops that limit the rotation of the valve ball in opposite directions. The two stops are screw threadedly adjustable from the exterior of the valve structure. In addition, the invention provides external indicator means to show to which of the two alternate positions the valve ball is rotated.

Still another important object of the invention is to avoid either completely cutting off flow through the pipeline or drastically reducing the flow in the procedure of either launching or retrieving a pig. For this purpose the passage through the ball that forms the pig receiving cavity is designed for substantial flow past a pig in the cavity. In addition, the valve chamber that encloses the valve ball forms with the valve ball space for flow bypassing the valve ball. As a result the momentary presence of a pig in the valve ball cavity does not cut off flow through the pipeline.

Finally, an object of the invention is to provide such a device and method that may be readily employed either for launching or retrieving a pig. If the device is to be employed for launching a pig, the housing structure is oriented with the pig magazine uppermost so that a pig in the magazine will gravitate into the cavity in the valve ball. On the other hand, if the device is to be employed to retrieve a pig, the housing structure is oriented with the magazine on its underside so that a pig ball in the valve ball cavity may gravitate into the magazine.

As heretofore stated, the gearing rotates the valve ball through 90° between a closed position at which the valve ball cavity registers with the magazine and an alternate open position at which the valve ball cavity registers with one of the two ports of the housing structure for flow through the pipeline. If the device is to be used to launch a pig, the device is positioned in the pipeline so that said one port of the housing structure is the downstream port or outlet port. On the other hand, if the device is to be employed to retrieve a pig ball from the pipeline, the device is positioned with said one port on the upstream side of the device. Thus, the difference between employing the device to launch a pig and employing the device to retrieve a pig resides solely in the positioning of the device in the pipeline, no structural modifications being required.

The various features and advantages of the invention may be understood by reference to the following detailed description and the accompanying drawings.

BRIEF DESCRIPTION OF THE DRAWINGS

In the drawings, which are to be regarded as merely illustrative.

DESCRIPTION OF THE PRESENTLY PREFERRED EMBODIMENT OF THE INVENTION

Figure 1:
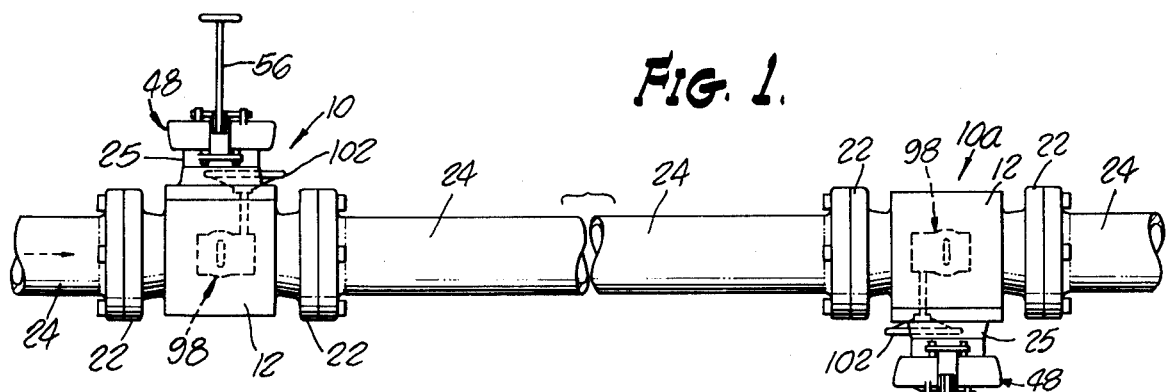
FIG. 1 is an elevational view of a pipeline with one upstream pig ball valve incorporated therein for launching a pig ball and a second pig ball valve positioned downstream to retrieve a pig ball.
Figure 3:
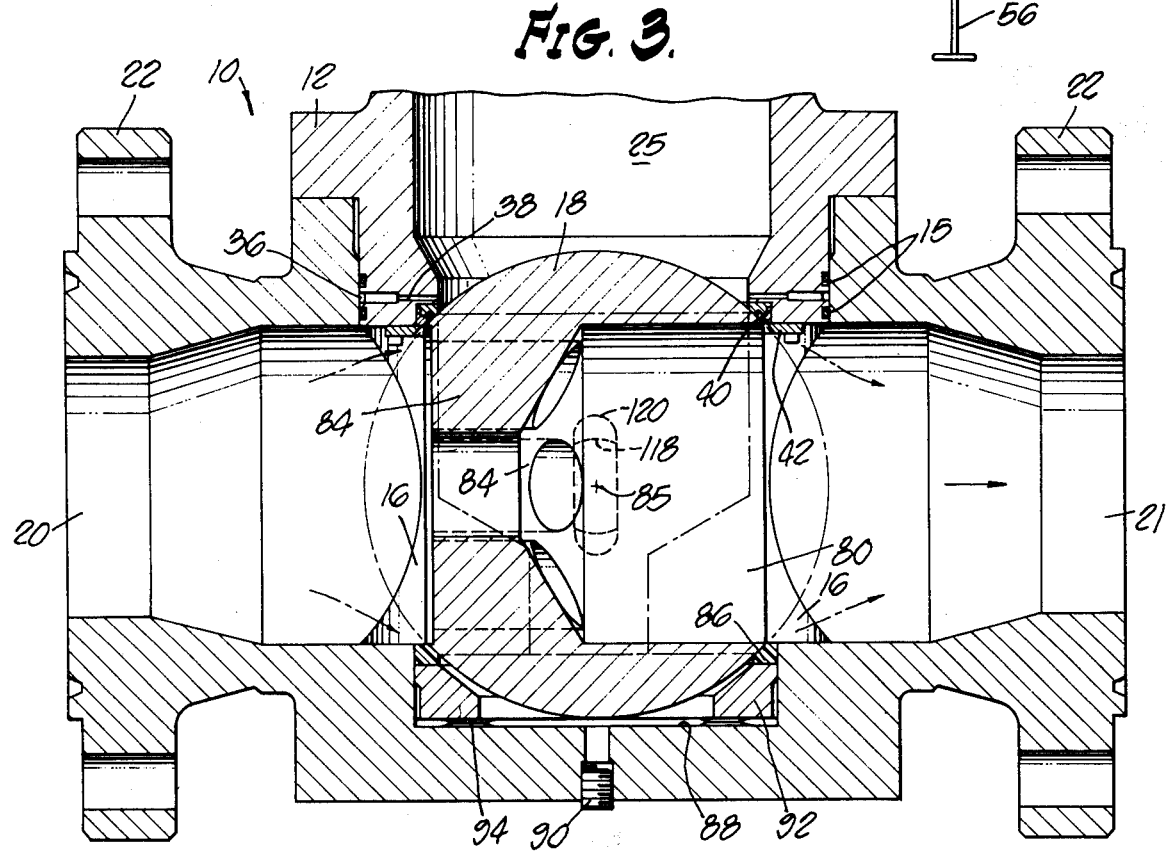
FIG. 3 is a transverse section taken as indicated by the line 3—3 of FIG. 2.

Referring first to FIGS. 1, and 3, a pig ball valve, generally designated by numeral 10, of the present invention has a housing structure 12 which comprises upper and lower sections connected together by cap screws 14 with the juncture sealed by a pair of spaced circumferential O-rings 15. The lower housing structure forms a vertical cylindrical valve chamber 16 that completely encloses a valve member in the form of a valve ball 18. The valve chamber 16 communicates with two diametrically opposite ports 20 and 21 that are provided with suitable flanges 22 to permit the pig ball valve to be incorporated in a pipeline such as the pipeline 24 in FIG. 1.

The upper section of the housing structure forms a cylindrical chambered pig ball magazine 25 for communication with the valve chamber 16, the pig ball magazine having a suitable exterior closure 26 which is normally closed. The magazine 25 has a bleeder port 28 controlled by a bleeder valve 30 and also has a bypass for communication with the valve chamber 16. In the construction shown a bypass valve 32 of the needle type is threaded into a bore 34 of the valve chamber. A bore 35 places the bore 34 in communication with a circumferential channel 36 between the two O-rings 15 and the circular channel in turn is in communication with the magazine 25 through radial bores 38.

An elastomer sealing ring 40 serves as a valve seat for the valve ball 18 and cooperates with the valve ball to seal off the pig ball magazine 25 from the valve chamber 16. The elastomer seal 40 is removably secured by a ring 42 that is anchored by suitable screws 44.

Figures 2, 5, 6:
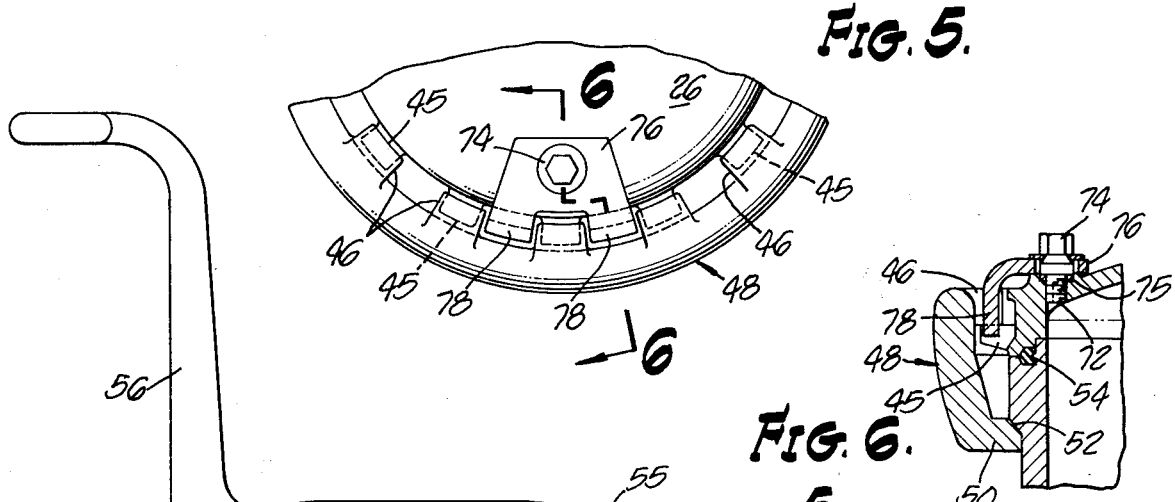
FIG. 2 is a vertical section of the upstream pig ball valve, partly in side elevation.
FIG. 5 is a fragmentary plan view of the closure of the pig ball magazine as seen along the line 5—5 of FIG. 2.
FIG. 6 is a fragmentary section taken along the line 6—6 of FIG. 5 showing the construction of means to lock the closure of the pig ball magazine.

The closure 26 of the pig ball magazine 25 is constructed in accord with the teachings of the Hall U.S. Pat. No. 2,869,752, which patent is hereby incorporated into the present disclosure by reference. As indicated in FIGS. 2 and 5, the closure 26 is in the form of a cover having a circumferential series of outwardly directed helical projections 45 that engage a corresponding series of inwardly directed helical projections 46 of a surrounding retaining ring 48, the retaining ring being formed with a lower inward flange 50 in engagement with an outer circumferential shoulder 52 of the magazine wall. When the projections 45 and 46 are rotated into mutual engagement by rotation of the retaining ring to tighten the closure 26 against the rim of the magazine 25, the closure compresses a gasket 54 to seal off the magazine.

The cover or closure 26 is rigidly attached to an overhanding hinge structure 55 that has a handle 56 and is hingedly connected by pivot means 58 to a bracket 60 that is welded to the outer circumferential wall of the magazine 25. A pair of diametrically opposite ears 62 of the cover or closure 26 are positioned adjacent corresponding ears 64 of the retaining ring 48.

The locking of the closure 26 is accomplished by rotation of the retaining ring 48 relative to the closure and to facilitate such relative rotation, suitable screws 65 equipped with nuts 66 connect the ears 64 of the retaining ring with the ears 62 of the closure. Thus, with the ears 64 spaced from the ears 62, the nuts 66 may be tightened to force the relative rotation of the retainaing ring that is required to lock the closure in place. Rotation of the retaining ring is facilitated by a circumferential series of rollers 68 that engage the underside of the flange 50 of the retaining ring and are mounted in suitable brackets 70 on the outer circumferential wall of the magazine 25.

In accord with the teachings of the Hall patent, the closure 26 has a vent port 72 shown in FIG. 6 which is normally closed by a vent plug 74 that is embraced by a suitable sealing ring 75. The vent plug 74 serves as a screw to retain a locking member 76 that has two fingers 78 that turn downward between projections 46 of the retaining ring 48 and thus lock the retaining ring against release rotation relative to the closure 26. To free the retaining ring for release rotation, the vent plug 74 must be loosened to release the locking member 76 and the loosening of the vent plug opens the vent port 72 to bleed fluid from the magazine and thus equalize the pressure in the magazine with atmospheric pressure. It is apparent that the described arrangement is non-hazardous in a foolproof manner because if the operator fails to open the bleeder valve 30 before attempting to remove the closure 26, the preliminary manipulations for removing the cover will open the vent port 72 in the cover before the cover is disengaged from the retaining ring 48.

Figure 7:
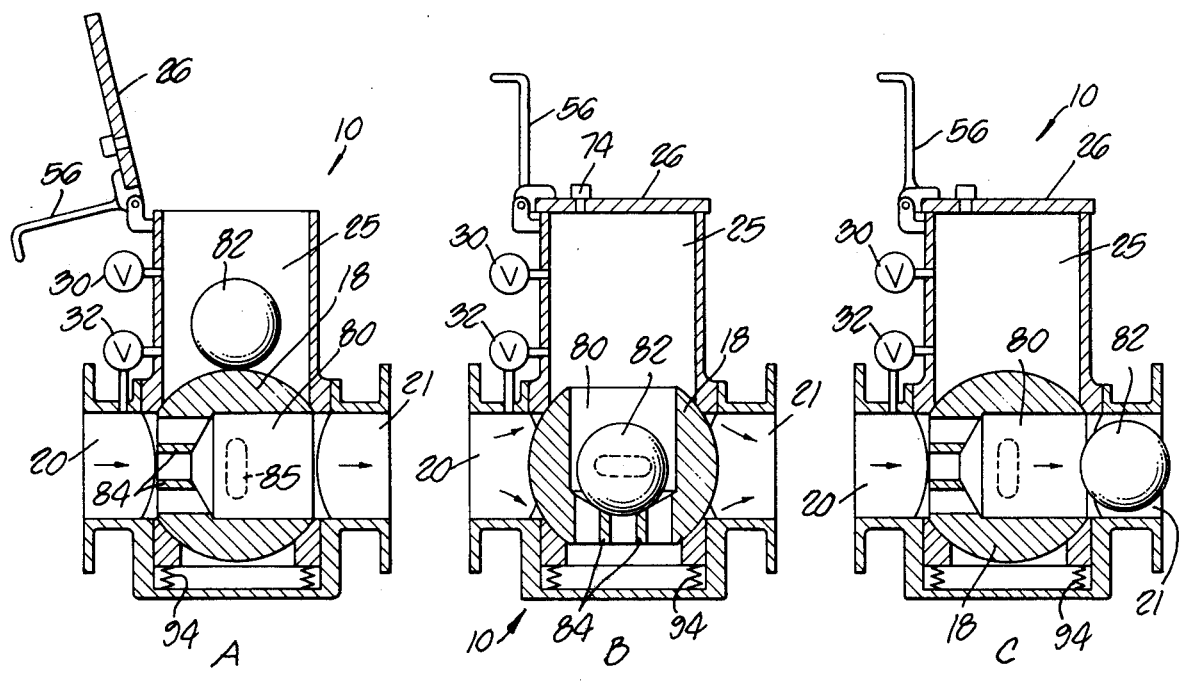
FIG. 7 is a diagram in which A, B and C illustrate the successive steps in employing the upstream pig ball valve to launch a pig ball into a pipeline.

As best shown in FIG. 7, the valve ball 18 has a cavity 80 large enough to receive a pig ball 82 and this cavity is one end of a diametrical fluid passage through the valve ball. The other end of the fluid passage is spanned by a grid 84 that permits fluid flow through the passage but blocks the movement of a pig ball through the passage.

Referring to FIG. 3, the valve ball 18 is rotatable on an axis 85 that is perpendicular to the axes of the two ports 20 and 21, the ball rotating in a plane that includes the axis of the pig ball magazine 25 as well as the axes of the two ports 20 and 21. The valve ball 18 is rotatable 90° between a closed position shown at B in FIG. 7 where the ball cavity 80 opens into the magazine 25 and its open position shown at C in FIG. 7 where the ball cavity registers with port 21 for full flow through the pipeline.

As shown in FIG. 3, the valve ball 18 seats on a plastic ring 86 in a circular well 88 at the bottom of the valve chamber 16, the well being provided with a removable drain plug 90. The seat ring 86 is supported by a heavier ring 92 which in turn is supported by a plurality of stacks of Belleville springs 94. Each stack of Belleville springs 94 is housed in a blind bore 95 on the underside of the heavy ring 92 and each stack embraces a guide pin 96 that is rigidly mounted in the bottom wall of the well 88. The combined force of the stacks of Belleville springs 94 is greater than the weight of the valve ball 18 to maintain the valve ball in pressure contact with the elastomeric sealing ring 40 in the absence of line pressure across the valve ball.

As heretofore stated, it is contemplated that the valve ball 18 at its position shown in FIG. 3 where it seals off the pig ball magazine 25 will have freedom for relative movement towards the elastomer sealing ring 40. Thus, the valve ball is floatingly mounted to accommodate itself to the elastomer sealing ring 40 and thus compensate for wear and thermal expansion and contraction of the cooperating parts as well as permit liberal tolerance in the dimension of the ball valve.

Referring to FIG. 2, the valve ball 18 is manually rotatable by means of gearing in a gear box 98, the gearing being controlled by a shaft 100 that extends upward from the gear box through a sealing ring 101 and is provided with a hand wheel 102 for manual operation, or if desired may be connected to suitable power actuating means for automatic operation. The gear box 98 is attached by suitable bolts 105 and nuts 106 to a circumferential flange 108 of an adapter 110 that in turn is mounted on the wall of the housing structure 12 by means of cap screws 112. The adapter 110 is sealed by an O-ring 114 and provides a journal for an operating stem 115 that extends into the valve chamber 16 and is sealed by an O-ring 116.

The inner end of the operating stem 115 is in the form of a diametrical tongue 118 that slidingly engages a slot 120 in the surface of the valve ball 18. As indicated in FIGS. 2 and 3, the slot 130 encompasses the axis of rotation 85. When the valve ball 18 is at its open position where it seals off the pig ball magazine 25, the slot 120 is perpendicular to the plane of the elastomer sealing ring 40. With the slot 120 substantially longer than the width of the operating tongue 118 and with the operating tongue normally at an intermediate position in the slot, the valve ball 18 is floatingly mounted with freedom to accommodate itself to the elastomer sealing ring 40 and thus compensate for wear as well as compensate for thermal expansion and contraction of the coacting parts.

Figure 4:
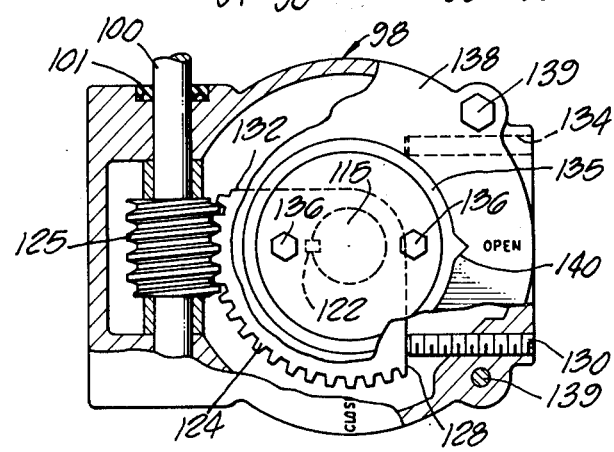
FIG. 4 is a fragmentary side elevation as seen along the line 4—4 of FIG. 2, a portion of the view being in section to show the gearing that rotates the valve ball between its alternate positions.

The outer end of the operating stem 115 is of reduced diameter and is connected by a key 122 to a 90° worm gear segment 124 shown in FIG. 4. The worm gear segment is in mesh with a worm 125 on the operating shaft 100.

At the open position of the valve ball 18 that is shown in FIG. 3 and indicated at A in FIG. 7 where the valve ball cavity 80 is open to the port 21, the worm gear segment 124 is in the position shown in FIG. 4 where a shoulder 128 of the gear segment abuts a stop screw 130, the stop screw assuring accurate register of the valve ball cavity 80 with the port. At the alternate closed position of the valve ball indicated at B in FIG. 7 where the valve ball cavity 80 registers with the magazine 25, a second shoulder 132 of the gear segment abuts a second stop screw 134 which positions the valve ball cavity 18 in accurate alignment with the magazine.

An indicator disc 135 is fixedly mounted on the worm gear segment 124 by a pair of screws 136 that extend through a circular opening (not shown) in an outer cover 138 secured to the gear box 98 by cap screws 139. The indicator disc is outside the gear box and overhangs the outer cover 138 of the gear box. As shown in FIG. 4, a pointer 140 of the indicator disc registers with the word "open" on the outer cover 138 when the valve ball is in open position. When the valve ball is in its closed position, the pointer registers with the word "closed" which word is 90° away from the word open.

In FIG. 1 the described pig ball valve 10 launches pig balls into the pipeline 24 to be retrieved by a second pig ball valve 10a which may be several miles downstream.

To launch a pig ball by means of the pig ball valve 10, the following steps are performed in sequence.

First, if the valve ball 18 is not in its open position shown in FIG. 3 and indicated at A in FIG. 7, the hand wheel 102 is operated to move the valve ball to its open position and its position is checked by reference to the pointer 140 of the indicator disc 135. During rotation of the valve ball from its closed position to its open position, the bypass valve 32 is open to equalize the pressure on both sides of the elastomer seal 40, but when the valve ball reaches its open position the bypass valve 32 is manually closed to isolate the pig ball magazine 25 from the valve chamber 16. Bleeder valve 30 is now opened to reduce the pressure in the pig magazine 25 to atmospheric pressure. The vent plug 74 is then removed to free the locking member 76 and to vent the magazine if inadvertently the operator has neglected to open bleeder valve 30. Then the screws 65 and the nuts 66 are removed to permit the retaining ring 48 to be rotated manually to release the cover or closure 26. The handle 56 of the hinge structure 55 is then manipulated to swing the closure 26 out of the way to open position. A pig ball 82 is then inserted into the magazine 25 as shown at A in FIG. 7.

The next step is to close and lock the closure 26 and then to close the bleeder valve 30. With the bleeder valve 30 closed, the bypass valve 32 is opened to equalize the pressure in the pig ball magazine 25 with the pressure in the valve chamber 16. Then the hand wheel 102 is manipulated to turn the valve ball 18 from the open position shown at A in FIG. 7 to the closed position shown at B in FIG. 7 to permit the pig ball 82 to gravitate into the cavity 80 of the valve ball 18 as shown. The hand wheel 102 is again manipulated to return the valve ball 18 from the closed position shown at B in FIG. 7 to the open position shown at C in FIG. 7 where fluid flowing through the valve ball passage forces the pig ball 82 through the port 21 into the pipeline 24 for eventual retrieval of the pig ball by the distant second pig ball magazine 10a.

There is no structural difference between the launching pig valve 10 and the retrieving pig valve 10a, the sole difference being in the orientation of the two pig valves. The pig valve 10a is rotated 180° about the axis of the two ports 20 and 21 from the position of the pig ball valve 10 to place the pig ball magazine 25 on the underside of the pig ball valve as shown in FIG. 1. The pig ball valve 10a is also rotated 180° about the axis of the pig ball magazine from the position of the launching pig ball valve 10 to place the port 21 of the pig ball valve on the upstream side of the valve instead of on the downstream side.

Figure 8:
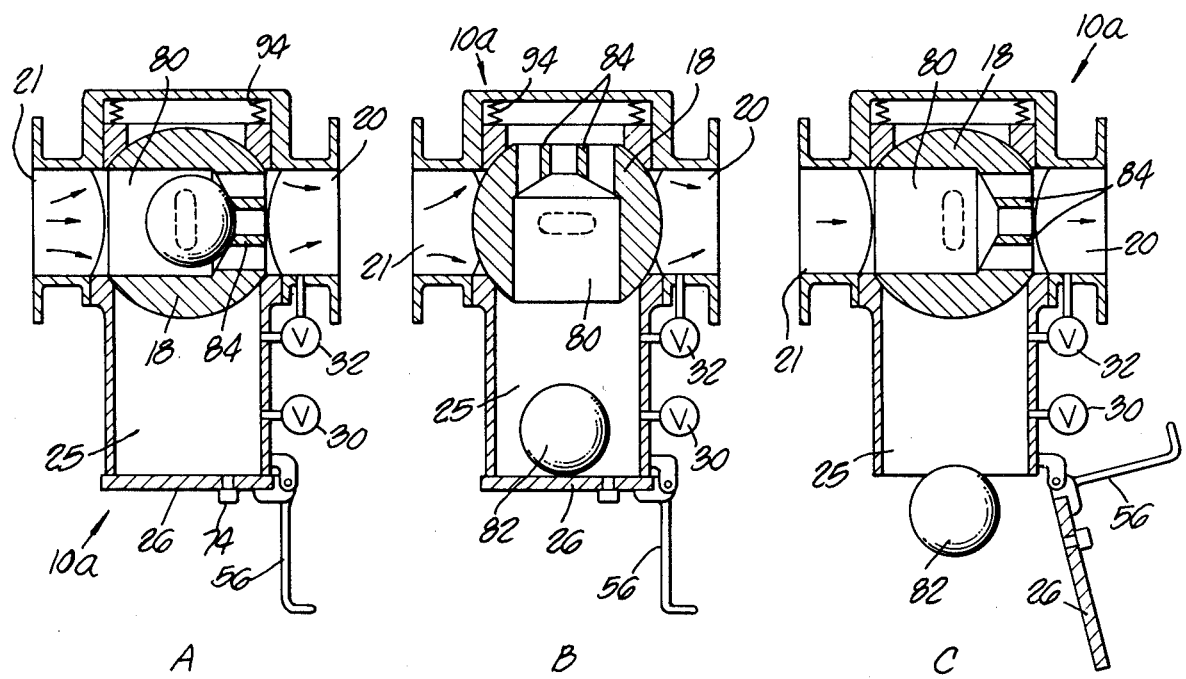
FIG. 8 is a similar diagrammatic view in which A, B and C illustrate the successive steps in employing the downstream pig ball valve to retrieve a pig ball from the pipeline.

To retrieve a pig ball 82 by the downstream pig ball magazine 10a in FIG. 1, the following steps are taken in sequence. It is made sure that the valve ball 18 is in its open position shown at A in FIG. 8 to capture the pig ball 82 in the cavity 80 of the valve ball as shown. In preparation for turning the valve ball 18 to the closed position shown at B in FIG. 8, bleeder valve 30 is closed and bypass valve 32 is opened to equalize the pressure in the pig ball magazine 25 with the pressure in the valve chamber 16. The hand wheel 102 is then manipulated to rotate the valve ball 18 to the closed position indicated at B in FIG. 8 with the result that the pig ball 82 drops out of the cavity 80 of the valve ball into the pig ball magazine. While the pressure in the pig ball magazine is equalized with the pressure in the valve chamber, the hand wheel 102 is manipulated to rotate the valve ball back to its open position. The bypass valve 32 is then closed and the bleeder valve 30 is opened to reduce the pressure in the pig ball magazine to atmospheric pressure. The closure 26 is then opened to permit the pig ball 82 to drop out of the magazine as shown at C in FIG. 8. Making sure the gasket 54 is in place, the closure 26 is then closed and locked. Then the bleeder valve 30 is closed.

It is to be noted that whenever the valve ball 18 is in an open position without a pig ball in the ball valve cavity, there is no drastic pressure drop across the valve ball. The grid 84 would cause a substantial pressure drop were it not that substantial fluid flow bypasses the valve ball 18. The fact that the valve chamber 16 is of vertical cylindrical configuration provides four spaces 141 (FIG. 2) 90° apart for bypass flow past the valve ball, the bypass flow being indicated by arrows in FIG. 3. In this regard, it is important to note that the ports 20 and 21 are enlarged adjacent the valve ball to the diameter of the valve ball cavity 80.

The foregoing description in specific detail of the presently preferred practice of the invention will suggest various changes, substitutions and other departures from the disclosure within the spirit and scope of the appended claims.

What is claimed is:

1. In a device for launching and/or retrieving a pig for cleaning out a fluid-conveying pipeline, the combination of:

a housing structure forming (1) coaxial inlet and outlet ports for incorporation of the housing structure in the pipeline, (2) a valve chamber between the two ports and (3) a pig magazine dimensioned to house the pig and opening onto the valve chamber with the axis of the magazine extending laterally of the two ports;

a valve member in the valve chamber and cooperating therewith to form a continuous flow passage between the inlet and outlet ports;

a passage through the valve member, one end of said passage being a cavity to hold the pig;

means at the opposite end of the passage to prevent escape of the pig therethrough while permitting fluid flow therethrough between the two ports, said valve member being rotatable about an axis perpendicular to the axis of the two ports in a plane of rotation that includes the axis of the magazine and the axes of the two ports to permit rotating said cavity into register with the magazine and at least one of the two ports selectively;

a normally closed closure for the magazine to permit access to the magazine from the exterior of the housing structure; and a valve seat forming a flow passage between the magazine and the valve chamber and being cooperative with the valve member to seal off the magazine from the valve chamber.

2. A combination as set forth in claim 1 which includes a valve-controlled bypass between the fluid flow in the valve chamber and the magazine to permit equalizing the fluid pressure in the magazine with the fluid pressure in the valve chamber to reduce resistance to rotation of the valve member while the closure is closed.

3. A combination as set forth in claim 2 which includes means supporting the valve member for movement in the direction of said valve seat, and yielding means to hold the valve member against the valve seat when the fluid pressure is equalized on opposite sides of the valve seat.

4. A combination as set forth in claim 3 in which said yielding means is spring means exerting pressure on the side of the valve member that is away from the valve seat.

5. A combination as set forth in claim 4 in which said yielding means comprises stacked Belleville springs.

6. A combination as set forth in claim 3 in which the valve member is free to move relative to the valve seat when the valve member cuts off the magazine from the valve chamber thereby to prevent interference with the function of said yielding means.

7. A combination as set forth in claim 1 in which said valve seat is in the form of a continuous elastomer member.

8. A combination as set forth in claim 7 in which the valve member is spherical and the valve chamber is of cylindrical configuration and has its axis at a right angle to the flow axis between the inlet and outlet ports to provide spaces for flow past the exterior of the valve member.

9. A combination as set forth in claim 1 in which the valve chamber is of a configuration to form with the valve member space to permit bypass fluid flow from the inlet port to the outlet port around the valve member.

10. A combination as set forth in claim 1, which includes means for releasably securing said magazine closure in a closed position;

and in which said securing means includes a closure for a magazine bleeder port, and which requires opening of the bleeder port closure prior to manipulation of the securing means to a released position permitting opening of the magazine closure.

* * * * *